(No Model.)

C. ENSMINGER.
BOW SAW.

No. 303,138.  Patented Aug. 5, 1884.

Witnesses:
Alex Selkirk Jr
Charles Seering

Christian Ensminger
Inventor
by his Attorney
Alex Selkirk

UNITED STATES PATENT OFFICE.

CHRISTIAN ENSMINGER, OF ALBANY, ASSIGNOR OF ONE-HALF TO BENJAMIN F. EATON, OF COXSACKIE, NEW YORK.

BOW-SAW.

SPECIFICATION forming part of Letters Patent No. 303,138, dated August 5, 1884.

Application filed May 17, 1884. (No model.)

*To all whom it may concern:*

Be it known that I, CHRISTIAN ENSMINGER, a citizen of the United States, residing at Albany, in the county of Albany and State of New York, have invented certain new and useful Improvements in Bow-Saws, of which the following is a specification.

My invention relates to certain improvements on the saw embodying the invention set forth in Letters Patent of the United States, No. 66,690, granted to A. W. Elmer and myself July 16, 1867; and it consists in the combination of devices hereinafter described and particularly set forth.

The object of my invention is to provide means by which the saw-blade will be securely held with the straining-frame, and be readily adjusted and set at any desired angle in relation to said frame; also, to provide means by which the tension of the saw-blade in the straining-frame may be readily increased or lessened, and the operator be enabled to turn the cutting-edge of the saw-blade to any situation in relation to the frame. I attain these objects by the means illustrated in the accompanying drawings, forming a part of this specification, in which—

Figure 1:
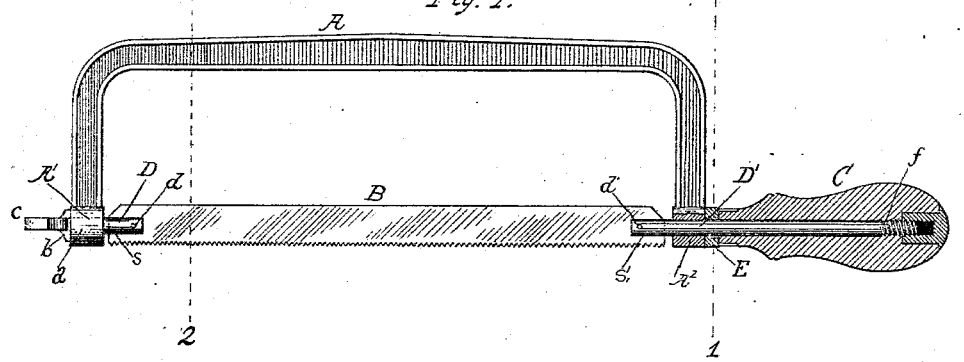
Figure 2:
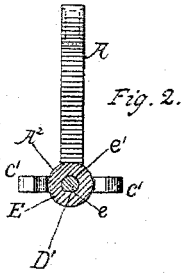
Figure 3:
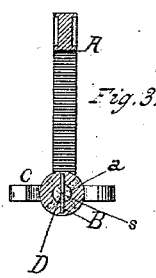

Figure 1 represents a side view of a saw embodying my improvements, with parts broken away to expose hidden parts thereof. Fig. 2 is a sectional view taken at line 1 in Fig. 1. Fig. 3 is a sectional view taken at line 2 in Fig. 1.

The same letters of reference refer to like parts throughout the several views.

In the drawings, A represents the straining-frame. B is the saw, and C is the handle. In the saw in patent before referred to one end of the saw is held by a pin in a slit made in the forward end of the frame, and the opposite end of the saw is held by a pin with a shank working in a sleeve made in the handle end of the frame, and passing through the same into the handle and engaging with a screw-threaded nut set into the rear end of the handle. In this form of construction the saw-blade is held in the same position in relation to the straining-frame. In my invention I provide with the forward end of the saw-frame the sleeve A', having a smooth bore, a. (Shown by full lines in Fig. 3, and by dotted lines in Fig. 1.) Loosely working in this bore of sleeve A' is the swivel-pin D, in the inner end of which is made slit s, Fig. 3, which slit receives the front end of the saw. The opposite end of this swivel-pin D is provided with shoulder b and a thumb-stem handle, c, for convenience of turning the swivel-pin in sleeve A'. The saw is secured in slit s of swivel-pin D by pin d. The opposite or handle end of the straining-frame is also provided with a smooth-bore sleeve, A², similar to smooth-bore sleeve A'. Working loosely in this sleeve A², so as to turn therein, is the shank-pin D', the forward end of which is provided with slit s', which receives the rear end of the saw, and pin d', which secures the end of the saw in said slit and holds it with shank-pin D'. Swivel shank-pin D' is made with an extension of length rearwardly from the rear end of sleeve A² nearly equal to the length of handle C, as shown in Fig. 1, and has one side thereof made with a flat surface, e, Fig. 2, while its other portions of surfaces are made circular, as shown in the same figure. The rear end of this shank-pin is provided with a screw-thread, f, which works into the screw-threaded nut let into the outer end of handle C.

Arranged on shank-pin D', and between handle C and sleeve A², is the finger-wrench E. (Shown in Figs. 1 and 2.) This finger-wrench is provided with a central bore, e', corresponding in size and form so as to nicely fit with the shank-pin D' and hold with the flattened side e thereof, and turn the same when it (the wrench) is turned, while at the same time the said shank-pin may be freely moved longitudinally in either direction within said wrench. This wrench is provided with finger-handle e', of any desired form, for convenience in turning said wrench in either direction. When finger-wrench E is held from turning, handle C may be freely turned in either direction for straining the saw in its frame or slacking the tension of the same. When the handle is slackened on the shank-pin, the operator may readily turn the same, together with the saw-blade, in either direction, by turning the finger-wrench correspondingly, and by this wrench the saw-blade may be set at any relative angle with the straining-frame, as illustrated by full and dotted lines in Fig. 3, without removal of the saw-blade, as the swivel-pin D, connected with the forward end of the saw, will freely turn in sleeve A when the finger-wrench is made to turn the swivel shank-pin D' and the saw-blade connected with both pins D and D'. The operator may, if he prefers, turn the saw-blade to any angle in relation to the straining-frame, when the handle is tightened on screw-thread $f$ of shank-pin D', by turning swivel-pin D and shank-pin D' simultaneously by means of the finger-stem handle $c$ and finger-wrench E.

These improvements are applicable to saws for sawing metals, and enable the operator to readily adjust and set the saw-blade at any relative angle in relation to the saw-frame, and obviate the necessity of removing the saw-blade for adjusting the same, as heretofore required.

Having described my invention, what I claim, and desire to secure by Letters Patent, is—

1. In a bow-saw having a straining-frame in which its limbs are provided with smooth-bore sleeves A' and A², holding the swivel-pins D D', which connect with the saw-blade, the shoulder $b$ on swivel-pin D, and finger-wrench E, loosely mounted on the swivel shank-pin D' between the screw-tightening handle C and sleeve A², and holding with said pin for turning the same and the connected saw in either direction, substantially as and for the purposes set forth.

2. The combination, with straining-frame constructed substantially as shown, and provided with smooth-bore sleeves A' A², saw-blade B, swivel-pin D, and swivel shank-pin D,' connecting with saw-blade and working freely in said sleeves, handle C, connected with the swivel shank-pin by screw-threads, of thumb-stem handle $c$, made with swivel-pin D, and finger-wrench E, arranged loosely on swivel shank-pin D', and between its sleeve A² and the screw-tightening handle C, substantially as and for the purposes set forth.

CHRISTIAN ENSMINGER.

Witnesses:
ALEX. SELKIRK, Jr.,
CHARLES SELKIRK.